(12) United States Patent
McBroom

(10) Patent No.: US 8,602,355 B2
(45) Date of Patent: Dec. 10, 2013

(54) AIRCRAFT WING

(75) Inventor: Geoffrey Peter McBroom, Somerset (GB)

(73) Assignee: Airbus Operations Limited, Bristol (GB)

( * ) Notice: Subject to any disclaimer, the term of this patent is extended or adjusted under 35 U.S.C. 154(b) by 703 days.

(21) Appl. No.: 11/793,553

(22) PCT Filed: Dec. 19, 2005

(86) PCT No.: PCT/GB2005/004908
§ 371 (c)(1),
(2), (4) Date: Jun. 19, 2007

(87) PCT Pub. No.: WO2006/067403
PCT Pub. Date: Jun. 29, 2006

(65) Prior Publication Data
US 2008/0156936 A1    Jul. 3, 2008

(30) Foreign Application Priority Data
Dec. 21, 2004   (GB) .................................. 0427957.6

(51) Int. Cl.
*B64C 3/26* (2006.01)
(52) U.S. Cl.
USPC ........................................ 244/123.1; 244/124
(58) Field of Classification Search
USPC ............. 244/131, 132, 123.1, 123.14, 123.2, 244/123.3, 123.4, 123.7, 123.8, 123.9, 124
See application file for complete search history.

(56) References Cited

U.S. PATENT DOCUMENTS

| | | | |
|---|---|---|---|
| 2,473,728 A * | 6/1949 | Rutledge | 52/586.1 |
| 2,549,110 A * | 4/1951 | Michael | 244/129.4 |
| 2,956,759 A * | 10/1960 | Creasey et al. | 244/15 |
| 3,004,645 A * | 10/1961 | Moul, Jr. | 244/131 |
| 3,165,280 A * | 1/1965 | Lee | 244/12.4 |
| 3,640,492 A * | 2/1972 | Star | 244/124 |
| 3,775,238 A * | 11/1973 | Lyman | 428/167 |
| 4,003,533 A * | 1/1977 | Carter et al. | 244/217 |
| 4,457,249 A * | 7/1984 | Disen | 114/88 |
| 4,574,325 A * | 3/1986 | Holton | 361/218 |
| 5,086,601 A * | 2/1992 | Galowitz et al. | 52/656.2 |
| 5,106,037 A * | 4/1992 | Sherrill | 244/132 |
| 5,575,439 A * | 11/1996 | Heinze et al. | 244/131 |
| 5,803,406 A * | 9/1998 | Kolodziej et al. | 244/171.7 |
| 5,836,550 A * | 11/1998 | Paez | 244/214 |
| 6,290,182 B1 * | 9/2001 | Grunditz | 244/173.1 |
| 6,764,047 B2 * | 7/2004 | Miller et al. | 244/131 |
| 8,128,020 B2 * | 3/2012 | Pitt et al. | 244/48 |
| 2002/0100840 A1 * | 8/2002 | Billinger et al. | 244/131 |
| 2008/0067289 A1 * | 3/2008 | Meyer | 244/131 |

FOREIGN PATENT DOCUMENTS

| | | |
|---|---|---|
| FR | 555937 | 7/1923 |
| FR | 824987 | 2/1938 |
| GB | 1022131 | 3/1966 |

* cited by examiner

*Primary Examiner* — Timothy D Collins
*Assistant Examiner* — Brian M O'Hara
(74) *Attorney, Agent, or Firm* — Patterson Thuente Pedersen, P.A.

(57) ABSTRACT

The invention relates to an aircraft wing panel, for example, a trailing edge upper panel'1 which is joined to the wing skin (20) by means of spigots (19) which project and engage with slots (13). Preferably, the slots are provided in lips (10, 11, 12) which extend from the leading edge (5) of the panel and the spigots (19) are fastened to and extend from the wing skin (20).

21 Claims, 9 Drawing Sheets

AIRCRAFT WING

BACKGROUND OF THE INVENTION

The invention relates to an aircraft wing, and to a panel for use in an aircraft wing.

The trailing edge panels of aircraft wings are conventionally fastened to the wing skin along their leading edges with buttstraps. Those buttstraps help to secure the trailing edge panels in place and keep their leading edges in close alignment with the trailing edges of the wing skin. However, the buttstraps also transfer strains (both bending and thermal) from the wing box to the leading edge of the trailing edge panel. One approach to dealing with that transfer of strain has been to modify the trailing edge panels to accommodate the strain, for example, by designing the trailing edge panel to be generally of carbon fibre composite but to have a glass fibre composite leading edge (glass fibre composite having a greater elasticity than carbon fibre composite). However, such panels are complex to manufacture.

SUMMARY OF THE INVENTION

The invention provides an aircraft wing including a wing skin and at least one edge panel adjacent to the wing skin in which either (a) the at least one edge panel has, in the region of its edge adjacent the wing skin, at least one apertured member which extends into the interior of the wing and has an aperture, the aperture engaging with a projecting member extending from the wing skin; or (b) the wing skin has, in a region adjacent the at least one edge panel, at least one apertured member which extends into the interior of the wing and which has an aperture, the aperture engaging with a projecting member extending from the at least one edge panel.

Preferably, the apertured member is integral with, that is, made as one piece with the edge panel or the wing skin.

The at least one edge panel may be, for example, an upper or lower leading edge panel or an upper or lower trailing edge panel. The invention is of particular application to trailing edge panels and will be described below with particular reference to an upper trailing edge panel.

In the wing of the invention, the leading edge of the at least one edge panel is held in vertical alignment with the trailing edge of the wing skin by engagement of the projecting member with the apertured member. Accordingly, there is no need to fasten the edge panel to the trailing edge of the wing skin with buttstraps. Elimination of those buttstraps allows a considerable saving in weight in the wing of the invention, with consequent economic benefits in operation of the aircraft. Moreover, it is expected that in the wing of the invention, the vertical misfit between the edge panel and the wing skin will be held within finer tolerances during operation. Furthermore, in conventional edge panels the leading edge is machined and exposure to the airflow can lead to delamination of the machined edge. In the wing of the invention, the panel will typically be moulded with an inward-turning lip so there will be no machined edge facing the airflow.

In general it will be desirable to minimize the free play in a vertical direction of the projecting member in the aperture. However, it will also generally be desirable to provide for some free play in the spanwise direction so that most of the bending and thermal strains developed in the wing box are thereby accommodated and are not transferred to the edge panel. There is therefore less need to provide extra elasticity of the leading edge of the edge panel of the invention or sustain the high loads generated, with consequent benefits in the case of manufacture of the edge panels.

Preferably, the wing comprises at least two edge panels according to the invention. The wing may also comprise one or more edge panels attached to the wing skin by conventional means, for example, by buttstraps. Preferably, in the wing of the invention, all the upper trailing edge panels are edge panels according to the invention.

Whilst, as described above, in the wing of the invention the apertured member may be on the edge panel with the projecting member extending from the wing skin or the arrangement may be the opposite way around with the apertured member being on the wing skin and the projecting member extending from the edge panel, in general, the former arrangement is preferred (that is, the arrangement of paragraph a), above). The apertured member is desirably shaped such that it strengthens the leading edge of the edge panel, thereby reducing "quilting" of that leading edge during flight. ("Quilting" refers to localised bending in flight of the edge panel out of line with the wing skin in the region between fasteners.)

Advantageously, the at least one projecting member is a lip extending from the edge of the at least one edge panel into the interior of the wing. Advantageously, the lip is approximately perpendicular to the plane of the edge panel, so that it is especially resistant to bending of the leading edge of the panel.

The apertured member may extend over substantially the entire leading edge of the trailing edge panel. However, in general, the edge panel will be fixed to one or more ribs and it is convenient not to have any apertured member projecting inwardly in the regions of those ribs. Therefore, the wing panel may have two or more apertured members, for example, apertured lips, located at positions where they will not clash with ribs. For example, the edge panel may be fixed to two ribs and have two apertured members, one outboard of the ribs and one inboard of the ribs, and will typically have a lip (which may be non-apertured) extending across the region between the ribs to add strength to that region.

The edge panels will preferably be provided with two or more apertured members.

Preferably, the apertured member will be integral with (that is, make as one piece with) the edge panel. Thus, the apertured member may be an inwardly-projecting extension of the leading edge of the trailing edge panel.

Each apertured member may include one or more apertures. Preferably, the aperture will be in the form of a hole in the apertured member through which the projecting member projects. Optionally, each apertured member includes only one aperture. In general, for each aperture, a corresponding projecting member will be provided which extends and engages with the aperture. The or each aperture may be provided with a protective sleeve.

In one embodiment, the at least one edge panel has two apertured members, each apertured member being a lip extending from the edge of the edge panel adjacent the wing skin into the interior of the wing and each lip having one aperture. Advantageously, the at least one edge panel comprises a third lip which extends from a central region of the edge of the edge panel adjacent the wing skin into the interior of the wing.

In the case where the apertured member or members project from the wing skin and the projecting member or members project from the edge panel, the apertured members may also be in the form of one or more lips extending along the trailing edge of the wing skin, the lips being integral with the wing skin.

As mentioned above, the apertures and the projecting member are such that spanwise movement of a least a portion of the edge panel relative to the wing skin is possible. Typically, the width of the aperture in the spanwise dimension is greater than the width of the corresponding projecting member in the spanwise direction, so that there is some freedom of movement of the projecting member relative to the aperture in a spanwise direction. In that case, flexing of the wing box and thermal expansion and contraction of the wing box can be at least partially accommodated by localized spanwise relative movement between portions of the wing skin and portions of the edge panel, without the full strain being transferred. Preferably, the aperture as defined by the apertured member (including any protective sleeve) is at least 1 mm wider and more preferably at least 5 mm wider in a spanwise direction than the projecting member. For example, the aperture may be 35 mm wide in a spanwise direction and the projecting member may have a width of 25 mm in the spanwise direction, allowing relative movement of 5 mm in each direction. Preferably, the aperture will be no more than 50 mm wider than the projecting member in a spanwise direction.

Advantageously, the aperture is less than 200 mm, preferably less than 100 mm, and especially preferably less than 80 mm wide in a spanwise direction.

The projecting member may be of any convenient form but should, of course, be shaped so as to fit within the aperture (including any protective sleeve) and be strong enough that it can cope with the loads acting on it. The projecting member will project from the wing skin in a generally chordwise direction. Advantageously, the or each aperture is elongate in a spanwise direction with substantially straight upper and lower sides, and the corresponding projecting member has, in the region which engages with the aperture, corresponding upper and lower faces which are flat in a spanwise direction. In that way, the forces applied by the projecting member to the upper and lower sides of the aperture are spread over the spanwise width of the flat face of the projecting member.

The or each aperture may be a slot extending in a spanwise direction, the spanwise width of the slot being greater than the width of the projecting member in a spanwise direction. Typically, the projecting member will project through the slot and the inside edge of the slot will surround the projecting member. The aperture will preferably be provided with a sleeve for protecting the inside edges of the aperture. The sleeve may be of any suitable tough material.

The projecting member may be a spigot fastened to and extending from the edge panel or the wing skin, as the case may be. The projecting member is preferably made of metal. The projecting member may be of steel but is preferably of a lightweight metal such as aluminium or titanium. The projecting member may be fastened to the edge panel or wing skin by any suitable means, for example, by two or more bolts or by a single bolt and a locating edge which bears on the edge of the edge panel or wing skin.

As mentioned above, the edge panel may be an upper or lower leading edge panel or an upper or lower trailing edge panel.

In a favoured embodiment, the edge panel is an upper trailing edge panel.

The edge panel may be of metal, for example, aluminium, but is preferably of composite material, especially a carbon fibre composite material. In a preferred embodiment, the edge panel is of composite material and the apertured member is in the form of a lip which extends into the interior of the wing and is also of composite material and is made as one piece with the edge panel. The invention is particularly suitable for use with large edge panels. The edge panel may have a width in a spanwise direction of at least 1 m, especially at least 1.5 m.

The wing skin will usually be of metal, especially aluminium, but the invention is not limited to wings having metal wing skins.

The invention also provides an aircraft wing comprising a wing skin and at least one trailing edge panel adjacent to the trailing edge of the wing skin in which the at least one trailing edge panel comprises at least one lip on its leading edge, the lip extending inwardly of the at least one edge panel into the interior of the wing and being provided with at least one aperture, the trailing edge of the wing skin being provided with at least one projecting member, the or each projecting member extending through and engaging with the or each aperture to hold the edge panel in alignment with the wing skin.

In a further aspect, the invention also provides an edge panel for a wing, which includes either (a) an apertured member having an aperture, the apertured member being located in the region of one edge of the panel and projecting from the face of the panel which, in use, is in the interior of the wing so that, in use of the panel in the wing, the aperture can engage with a projecting member extending from the wing skin; or (b) a projecting member which is so located and shaped that, in use of the panel in a wing, the projecting member can engage with an apertured member extending from the wing skin into the interior of the wing.

The at least one edge panel will typically be fastened to at least one rib in a central portion of the panel and will be provided at its inboard and outboard edges with sliding joints which are associated with ribs at the inboard and outboard edges of the edge panel. The parts of the edge panel between the ribs are referred to as bays. Thus, a panel fastened to one central rib will be a two-bay panel and a panel fastened to two central ribs will be a three-bay panel. The edge panel of the invention may have one, two, three, four, or five or more bays.

The gap between the edge panel and the wing skin may be sealed in any suitable manner. The seal should be able to cope with the required degree of spanwise movement of the edge panel relative to the wing skin. The seal may be, for example, a foam seal or a rubber "P" seal.

DETAILED DESCRIPTION

Figure 1:
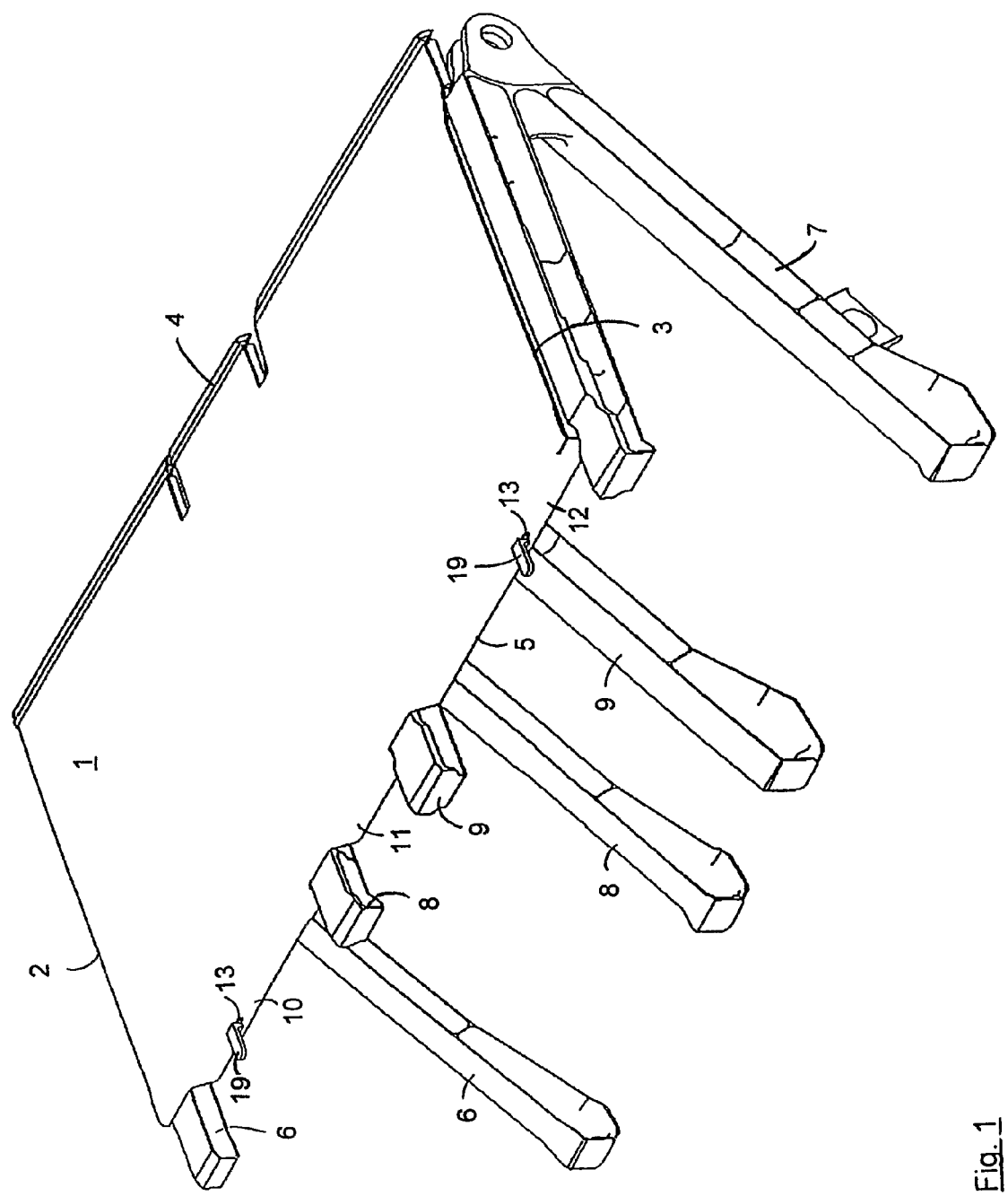
FIG. 1 is a partial view of a wing showing a panel according to the invention and four ribs.
Figure 2A:
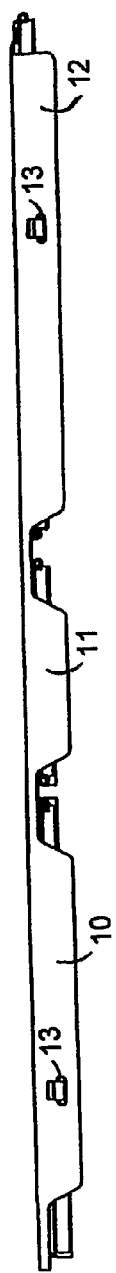
FIG. 2a is a view of the leading edge of the panel shown in FIG. 1.
Figure 2B:
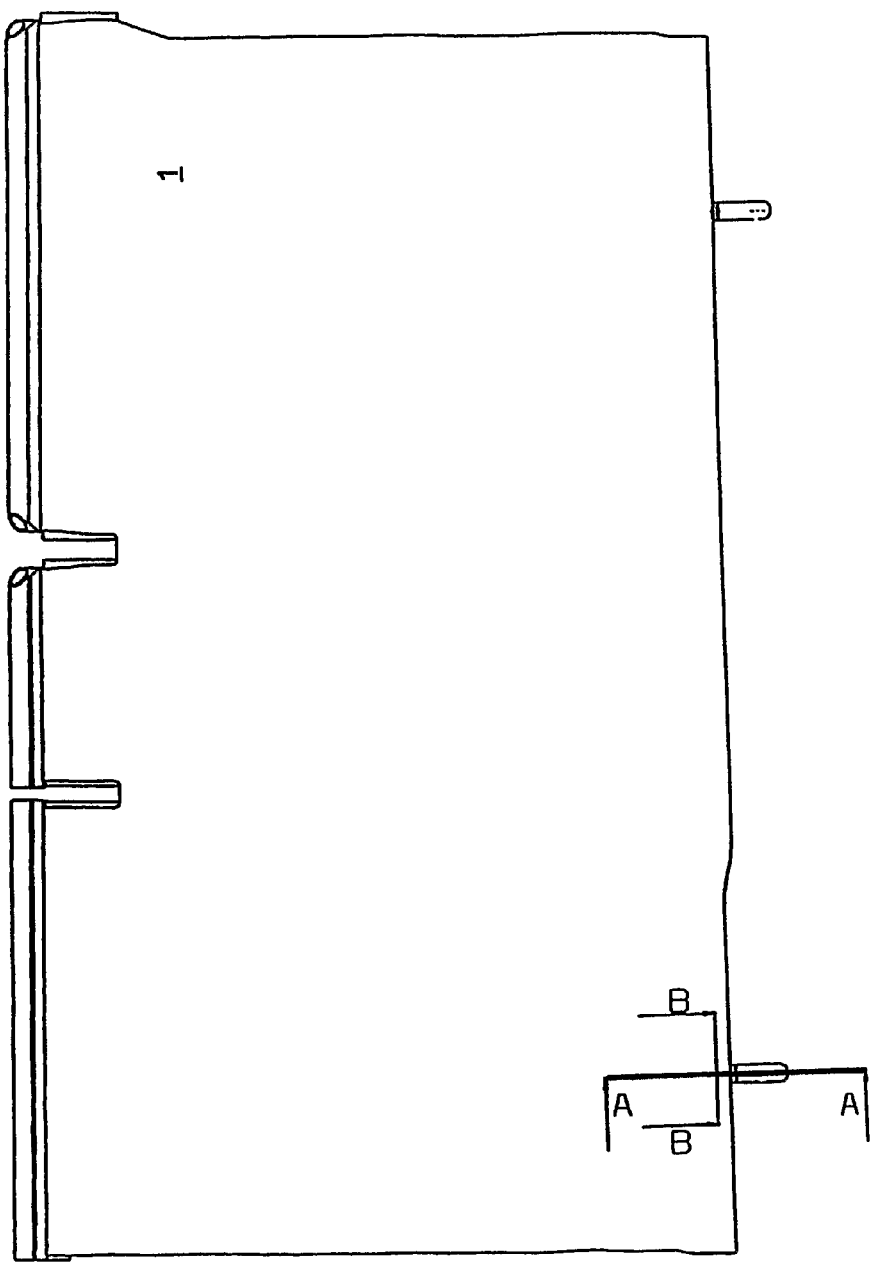
FIG. 2b is a view from above of the panel shown in FIG. 1.

FIG. 1 shows an upper trailing edge panel 1 according to the invention. The panel 1 is generally rectangular and has an inboard edge 2, an outboard edge 3, a trailing edge 4 and a leading edge 5. The panel 1 is made of carbon fibre composite material and has a spanwise width of about 2 meters, the length in the chordwise direction being about 1 meter.

At its inboard edge 2 and its outboard edge 3 the panel 1 is supported by ribs 6 and 7. The panel is connected to those ribs 6, 7 by sliding joints (not shown in FIG. 1). Such sliding joints are known in the aircraft industry (and are described below in relation to FIGS. 6 and 7) and comprise steel spigots projecting in a spanwise direction from each of the ribs 6 and 7. Aluminium angles are slideably mounted on those spigots so that each angle can move up and down its spigot in a spanwise direction. The panel is fastened to the other end of each aluminium angle. Those sliding joints allow the inboard and outboard panel edges 2, 3 to move relative to the inboard and outboard ribs 6, 7 but hold those panel edges against vertical movement. The degree of spanwise movement experienced by those sliding joints in the wing of the invention is likely to be significantly greater than in a conventional wing and so it will be desirable to allow for that in the design of the sliding joints, for example, by providing especially durable bushes.

The middle of the panel (in a spanwise direction) is supported by two further, spaced-apart ribs 8, 9. The panel 1 is fastened to those central ribs 8, 9 by bolts (not shown).

At its leading edge 5, the panel 1 is provided with three lips 10, 11, 12 which each project downward about 60 mm into the interior of the wing at 90° to the body of the panel. Lip 10 extends across the region between inboard rib 6 and the first central rib 8, lip 11 extends across the region between the two central ribs 8, 9 and lip 12 extends across the region between the second central rib 9 and the outboard rib 7. The three lips 10, 11, 12 each provide strength to their respective regions of the leading edge of panel 1.

Figure 3:
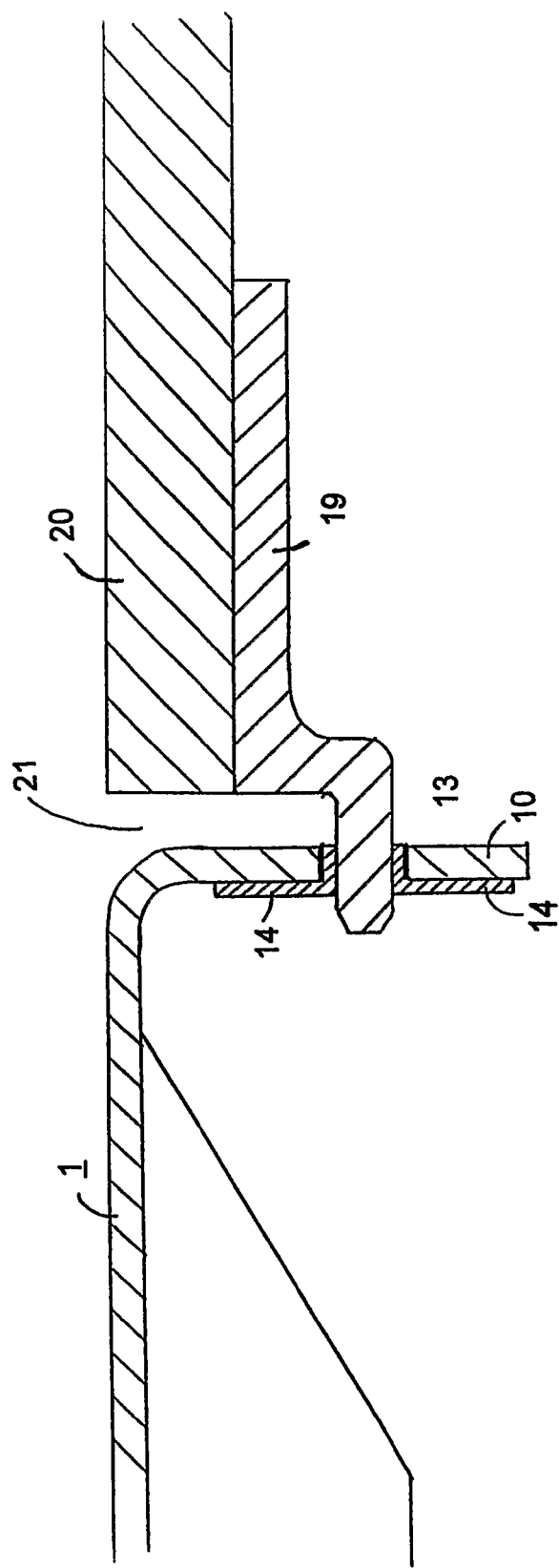
FIG. 3 is a cross-sectional view through the panel taken on the line A-A shown in FIG. 2b.
Figure 4:
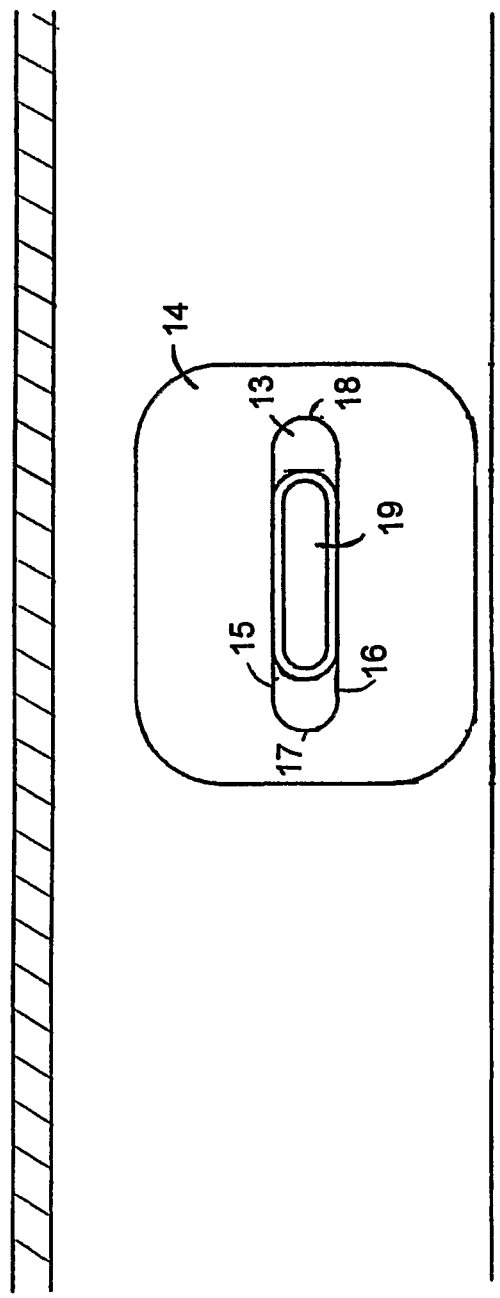
FIG. 4 is a cross-sectional view through the panel taken on the line B-B shown in FIG. 2b.

The outer two lips 10 and 12 are each provided with an aperture in the form of a horizontal slot 13. Those slots 13 (shown in greater detail in FIGS. 3 and 4) are each provided with a sleeve 14 which protects the inside edge of the slot. The sleeve 14 defines a slot-like aperture which has straight upper and lower edges 15, 16 and semicircular inboard and outboard edges 17, 18.

The aperture is 30 mm wide in a spanwise direction and has a vertical dimension of about 5 mm. Projecting through each slot 13 is a spigot 19, which is bolted to and projects from the underside of the wing skin 20 (not shown in FIG. 1). The spigot 19 fits closely against the upper and lower edges 15, 16 of the aperture 13 thereby holding the leading edge 5 of panel 1 vertically in alignment with the trailing edge of the wing skin 20. The spigot is only 20 mm wide in a spanwise direction and therefore is free to move in slot 13 up to 5 mm each way in a spanwise direction.

Figure 5:
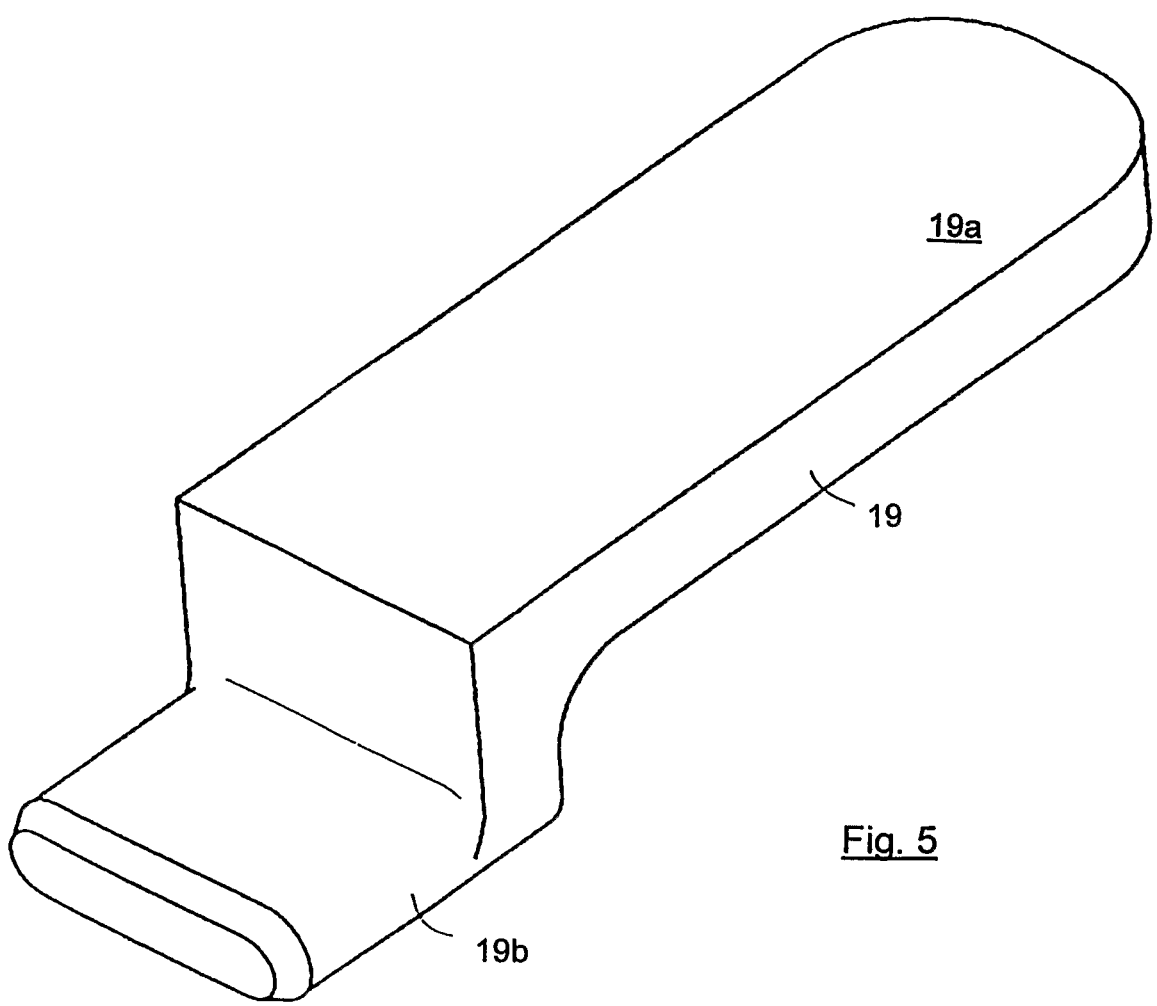
FIG. 5 is an isometric view of a spigot shown in FIGS. 1 to 4.

Spigots 19 (shown in FIG. 5) are of titanium and comprise a body 19a which includes two bolt holes (not shown in FIG. 5) for bolts which hold the body 19a to the underside of the wing skin 20. Parallel to but offset from the body is a projecting part 19b which extends, in use, through the slot 13.

In use of the wing, as the wing box flexes or undergoes thermal expansion and contraction, the spigots 12 move spanwise in the slots 13 and thereby do not transfer the wing box strains to the outer section of the panel 1. A study of a conventional wing having a trailing edge panel joined across its leading edge to the wing skin by buttstraps has shown that the strain transferred to the trailing edge panel reaches a sharp peak in the regions of the inboard and outboard leading edge corners of the panel. In the panel of the invention, transfer of that strain to those outer regions of the leading edge of the panel is reduced.

A seal (not shown in the figures) is provided in the gap 21 between the trailing edge of the wing skin 20 and the leading edge 5 of the panel 1.

In assembly of the wing, the panel 1 is dropped onto the ribs 6, 7, 8, 9 25 mm away from the trailing edge of the wing skin 20, and is then slid forward onto the spigots 19 before being fastened to the central ribs 8, 9 and to the inboard and outboard sliding joints.

Figure 6:
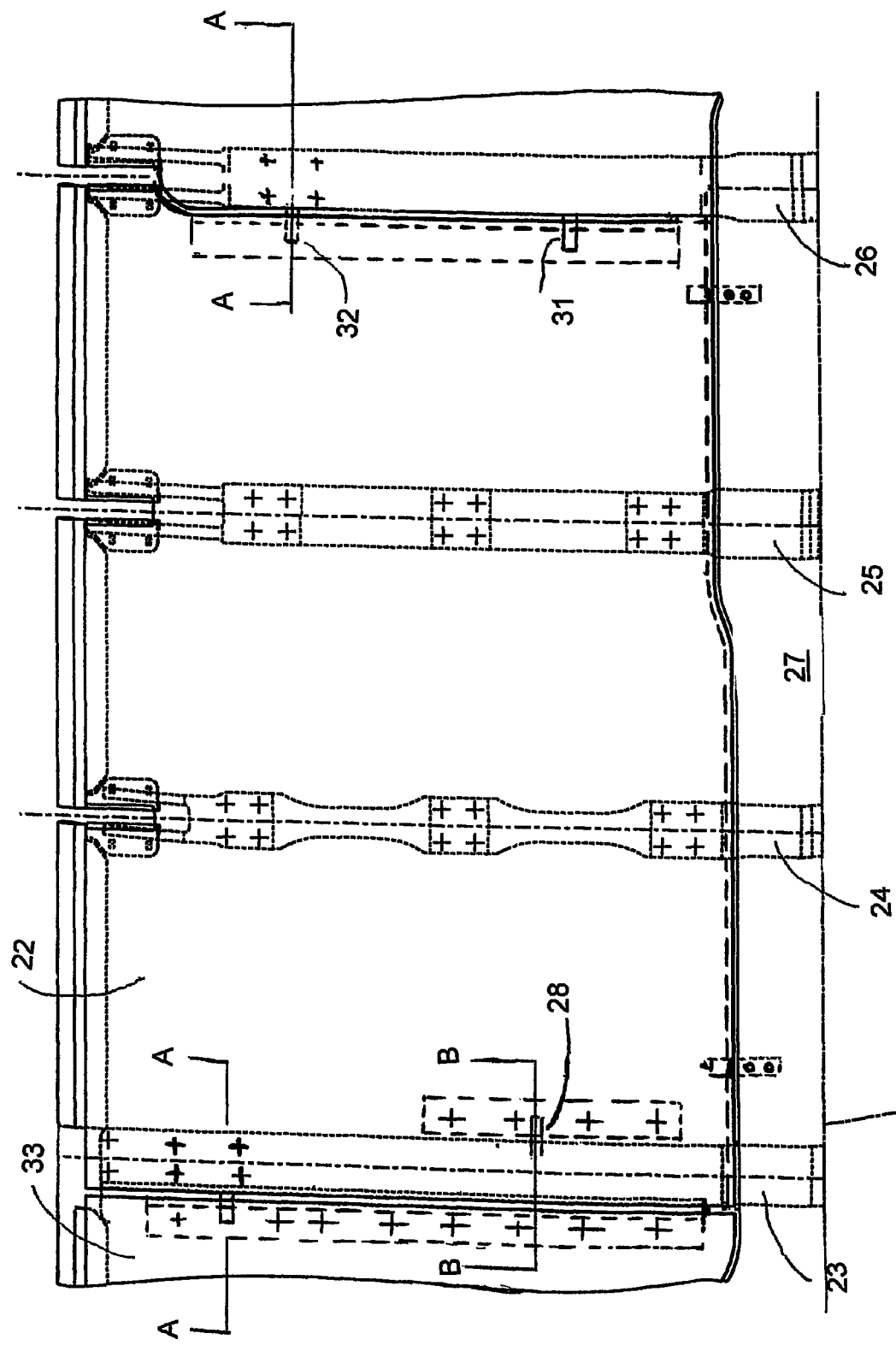
FIG. 6 is a view from above of a wing panel according to the invention mounted on four wing ribs.

FIG. 6 shows another wing panel 22 according to the invention fixed in place on four spaced-apart wing ribs 23, 24, 25 and 26. As shown in FIG. 6, the panel 22 is bolted directly on to the two centremost ribs 24 and 25 (bolts are denoted in FIGS. 6 and 8 by crosses). The left-hand side of panel 22 lies on rib 23 and, in the region of the trailing left-hand corner, is bolted directly to rib 23. In order to accommodate the loads applied to the leading edge of the panel 22 by the movement of the wing skin 27 the leading half of the left-hand side of panel 22 is fixed to rib 23 by means of a sliding joint 28. As can be seen from FIG. 7, the sliding joint comprises a section of aluminium angle 29 which is bolted to the underside of the leading half of the left-hand side of the panel 22 close to and parallel with the left-hand edge. That angle 29 is provided with a slot. A pin 30 projects laterally in a spanwise direction from rib 23 through that slot. The sides of the slot fit snugly around the pin 30, thereby restraining the panel 22 in the vertical and chordwise directions. The angle 29 can travel up and down the pin 30 thereby allowing some movement in the panel in a spanwise direction.

Figure 7:
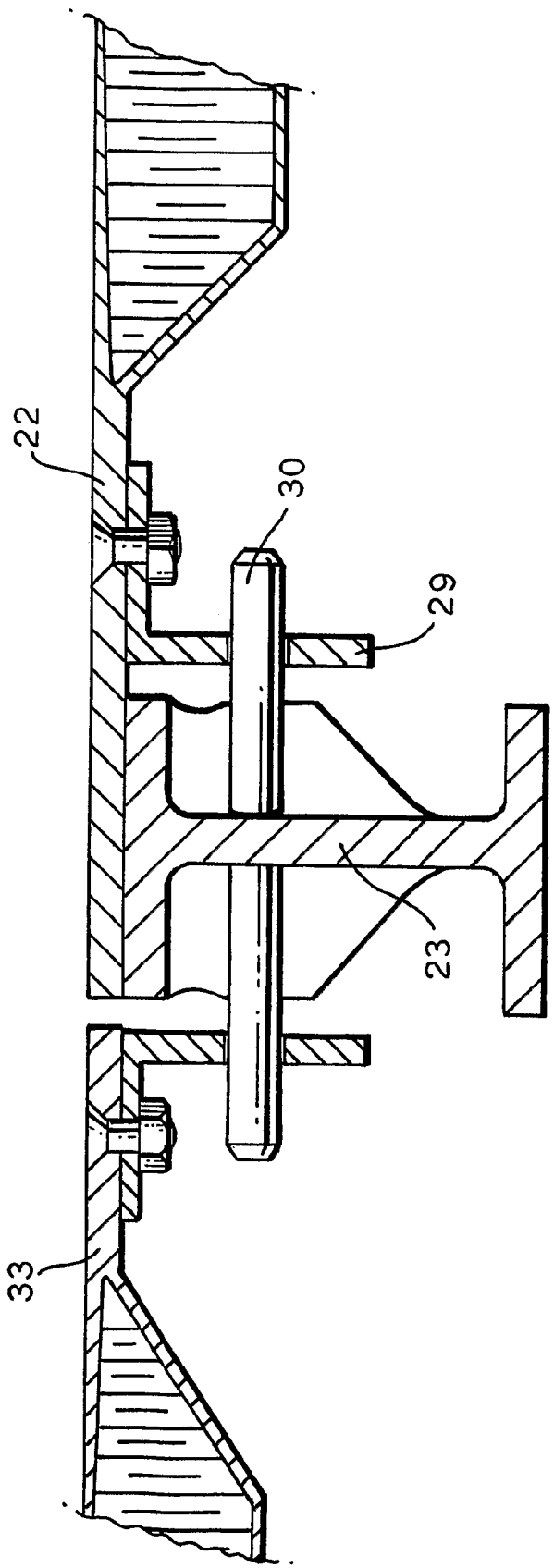
FIG. 7 is a cross-sectional view through the panel of FIG. 6 taken on line B-B.

The right-hand edge of the panel 22 extends up to, but does not lie on top of, the right-hand rib 26, and is not bolted to the rib 26 but is instead provided with two sliding joints 31, 32, similar to those shown in FIG. 7. Those sliding joints 31, 32 allow the right-hand edge of panel 22 to move somewhat in a spanwise direction, relative to rib 26. The panel 33 to the left of panel 22 is also provided at its right-hand edge with two sliding joints to rib 23.

Figure 8:
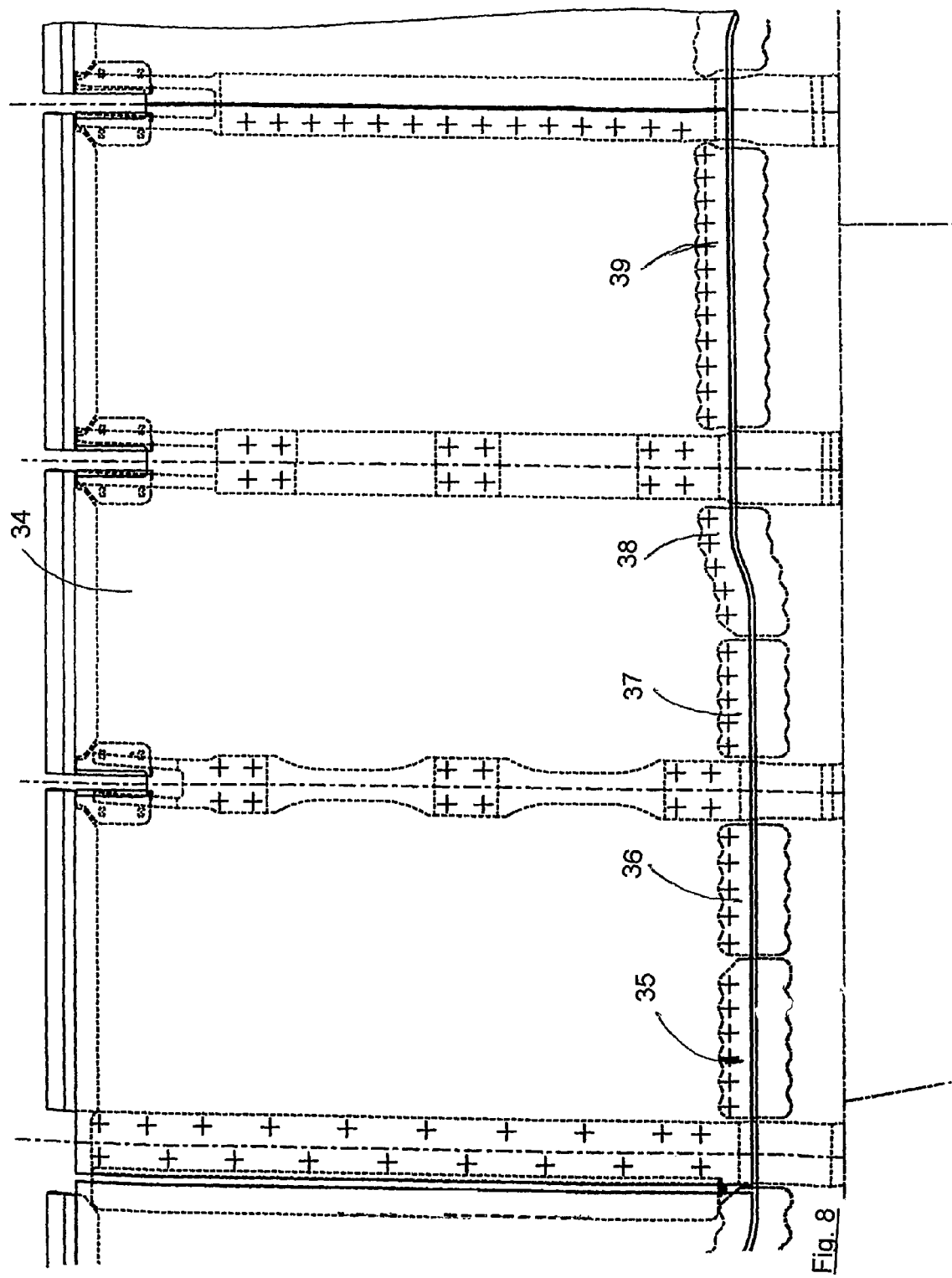
FIG. 8 is a view from above of a wing panel conventionally fixed in place using buttstraps.
Figure 9:
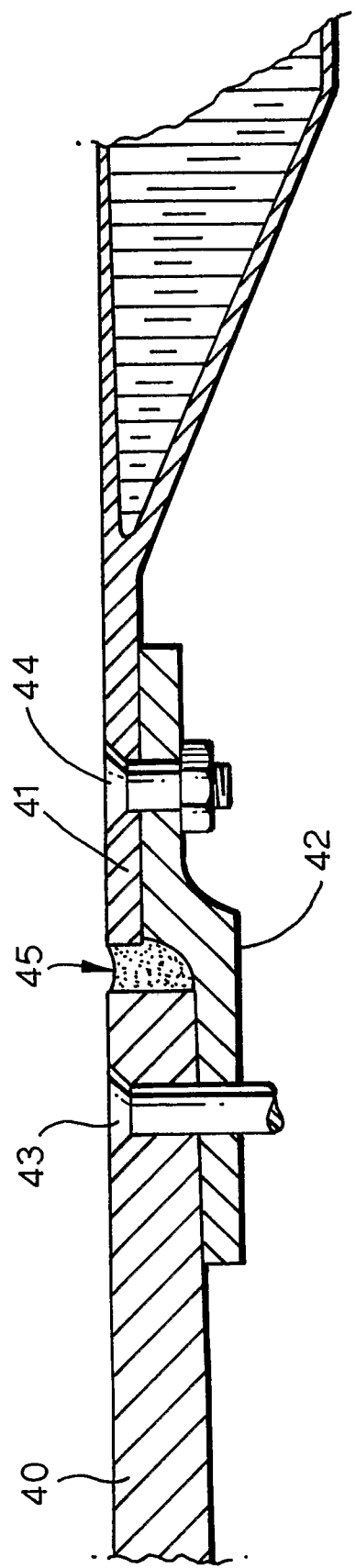
FIG. 9 is a cross-sectional view through part of a conventionally fixed wing panel of the type shown in FIG. 8.

FIG. 8 shows a conventional wing panel 34 and four wing ribs. At its leading edge the panel 34 is fastened to the trailing edge of the wingbox skin overhang by five buttstraps 35, 36, 37, 38 and 39. FIG. 9 shows a cross-section through such a buttstrap joint. Wingbox skin overhang 40 is fastened to the leading edge of a wing panel 41 by buttstrap 42, which is bolted to the skin 40 and panel 41 by bolts 43 and 44, respectively. A sealant 45 fills the gap between wing skin 40 and panel 41.

Whilst the present invention has been described and illustrated with reference to a particular embodiment it will be appreciated by those of ordinary skill in the art that the invention lends itself to many different variations not illustrated herein. For that reason, reference should be made to the claims for determining the true scope of the present invention.

The invention claimed is:

1. An aircraft wing including (i) an attachment structure; (ii) a wing skin connected to the attachment structure; and (iii) at least one edge panel adjacent to the wing skin, wherein the edge panel is fastened to the attachment structure using a slidable joint, such that the edge panel is connected to the wing skin and able to slide relative to the wing skin during use of the aircraft wing in flight, and wherein either (a) the at least one edge panel includes, in the region of its edge adjacent the wing skin, at least one apertured member being a lip which extends into the interior of the wing, and having an aperture, the aperture engaging with a projecting member extending from the attachment structure; or (b) the attachment structure is provided with, in a region adjacent the at least one edge panel, at least one apertured member being a lip which extends into the interior of the wing and which has an aperture, the aperture engaging with a projecting member extending from the at least one edge panel;

said projecting member extending generally transverse to the spanwise direction of the wing, and in which the aperture has a spanwise dimension greater than a spanwise dimension of the engaged projecting member thereby providing free play in one spanwise direction of the engaged projecting member in the aperture and thus allowing spanwise sliding movement of at least a portion of the edge panel relative to the wing skin; said lip slides relative to the projecting member, and in which the vertical dimension of the aperture is closely spaced to the vertical dimension of the engaged projecting member thereby minimizing free play in the vertical direction of the engaged projecting member in the aperture to prevent movement in a vertical direction of the engaged projecting member in the aperture.

2. An aircraft wing as claimed in claim 1(a), in which the at least one edge panel includes, in the region of its edge adjacent the wing skin, at least one apertured member being a lip which extends into the interior of the wing, and having an aperture, the aperture engaging with a projecting member extending from the attachment structure.

3. An aircraft wing as claimed in claim 2, in which the at least one edge panel has two apertured members, each apertured member being a lip extending from the edge of the edge panel adjacent the wing skin into the interior of the wing and each lip having one aperture.

4. An aircraft wing as claimed in claim 3, in which the at least one edge panel comprises a third lip which extends from a central region of the edge of the edge panel adjacent the wing skin into the interior of the wing.

5. An aircraft wing as claimed in claim 1, in which the at least one edge panel is a trailing edge panel.

6. An aircraft wing as claimed in claim 1(a), in which the lip extends from the edge of the at least one edge panel adjacent the wing skin into the interior of the wing.

7. An aircraft wing as claimed in claim 1, in which the aperture is a slot extending in a spanwise direction, the spanwise width of the slot being greater than the spanwise width of the corresponding projecting member.

8. A wing as claimed in claim 1, in which the at least one edge panel is fastened to at least one rib in a central portion of the panel and is connected to ribs at its inboard and outboard edges with sliding joints.

9. A wing as claimed in claim 1, in which the at least one edge panel is of a composite material.

10. An edge panel for a wing as claimed in claim 1, which includes either
   (a) an apertured member having an aperture, the apertured member being located in the region of one edge of the panel and projecting as a lip from the face of the panel which, in use, is in the interior of the wing so that, in use of the panel in the wing, the aperture can engage with a projecting member extending from the attachment structure; or
   (b) a projecting member which is so located and shaped that, in use of the panel in a wing, the projecting member can engage with an apertured member extending from the attachment structure into the interior of the wing;
   said projecting member extending generally transverse to the spanwise direction of the wing,
   and in which the at least one aperture and the at least one projecting member are sized to provide free play in the spanwise direction of the engaged projecting member in the aperture and thus allow spanwise movement of at least a portion of the edge panel relative to the wing skin; said lip slides relative to the projecting member, and while the at least one aperture and the at least one projecting member are also sized so as to minimize free play in the vertical direction of the engaged projecting member in the aperture and thus substantially preventing movement in a vertical direction of the projecting member or members in the aperture or apertures.

11. An aircraft comprising an edge panel according to claim 10.

12. An aircraft comprising the wing of claim 1.

13. An aircraft wing as claimed in claim 1 in which the aperture defined by the apertured member is at least 1 mm wider in a spanwise direction than the projecting member.

14. An aircraft wing as claimed in claim 13 wherein the apertured member includes a protective sleeve.

15. An aircraft wing as claimed in claim 1 in which the aperture defined by the apertured member is at least 5 mm wider in a spanwise direction than the projecting member.

16. An aircraft wing as claimed in claim 15 wherein the apertured member includes a protective sleeve.

17. An aircraft wing as claimed in claim 1(a) in which the edge panel is a trailing edge panel and the apertured member is integral with the edge panel and is an inwardly projecting extension of the leading edge of the trailing edge panel.

18. An aircraft wing as claimed in claim 1, in which the attachment structure comprises one or more ribs of the wing.

19. An aircraft wing comprising (i) an attachment structure; (ii) a wing skin connected to the attachment structure; and (iii) at least one edge panel adjacent to the trailing edge of the wing skin, wherein the edge panel is fastened to the attachment structure using a slidable joint, such that the edge panel is connected to the wing skin and able to slide relative to the wing skin during use of the aircraft wing in flight, and wherein the at least one trailing edge panel comprises at least one lip on its leading edge, the lip extending inwardly of the edge panel into the interior of the wing and being provided with at least one aperture, the attachment structure being provided with at least one projecting member, the or each projecting member extending through and engaging with one of the apertures to hold the edge panel in alignment with the trailing edge of the wing skin, said projecting member extending generally transverse to the spanwise direction of the wing, and in which the at least one aperture and the at least one projecting member are sized to provide free play in the spanwise direction of the engaged projecting member in the aperture and thus allow spanwise sliding movement of at least a portion of the edge panel relative to the wing skin while also sized so as to minimize free play in the vertical direction of the engaged projecting member in the aperture and thus substantially preventing movement in a vertical direction of the projecting member or members in the aperture or apertures.

20. An aircraft wing including (i) an attachment structure; (ii) a wing skin connected to the attachment structure; and (iii) at least one edge panel adjacent to the wing skin, wherein the edge panel is fastened to the attachment structure using a slidable joint, such that the edge panel is connected to the wing skin and able to slide relative to it during use of the aircraft using in flight, and wherein either
   (a) the at least one edge panel includes, in the region of its edge adjacent the wing skin, at least one apertured member being a lip which extends into the interior of the wing and having an aperture, the aperture engaging with a projecting member extending from the attachment structure; or (b) the attachment structure is provided with, in a region adjacent the at least one edge panel, at least one apertured member being a lip which extends into the interior of the wing and which has an aperture, the aperture engaging with a projecting member extending from the at least one edge panel;

said projecting member extending generally transverse to the spanwise direction of the wing, and in which the aperture has a spanwise dimension at least 1 mm greater than a spanwise dimension of the engaged projecting member thereby providing free play in one spanwise direction of the engaged projecting member in the aperture and thus allowing spanwise sliding movement of at least a portion of the edge panel relative to the wing skin; said lip slides relative to the projecting member, and in which the vertical dimension of the aperture is closely spaced to the vertical dimension of the engaged projecting member thereby minimizing free play in the vertical direction of the engaged projecting member in the aperture to prevent movement in a vertical direction of the engaged projecting member in the aperture.

21. An aircraft wing including (i) an attachment structure; (ii) a wing skin connected to the attachment structure; and (iii) at least one edge panel adjacent to the wing skin, wherein the edge panel is fastened to the attachment structure using a slidable joint, such that the edge panel is connected to the wing skin and able to slide relative to it during use of the aircraft wing in flight, and wherein either (a) the at least one edge panel includes, in the region of its edge adjacent the wing skin, at least one apertured member being a lip which extends into the interior of the wing and having an aperture, the aperture engaging with a projecting member extending from the attachment structure; or (b) the attachment structure is provided with, in a region adjacent the at least one edge panel, at least one apertured member being a lip which extends into the interior of the wing and which has an aperture, the aperture engaging with a projecting member extending from the at least one edge panel;

said projecting member extending generally transverse to the spanwise direction of the wing, and in which the aperture has a spanwise dimension at least 5 mm greater than a spanwise dimension of the engaged projecting member thereby providing free play in one spanwise direction of the engaged projecting member in the aperture and thus allowing spanwise sliding movement of at least a portion of the edge panel relative to the wing skin; said lip slides relative to the projecting member, and in which the vertical dimension of the aperture is closely spaced to the vertical dimension of the engaged projecting member thereby minimizing free play in the vertical direction of the engaged projecting member in the aperture to prevent movement in a vertical direction of the engaged projecting member in the aperture.

* * * * *